United States Patent [19]

White et al.

[11] Patent Number: 5,164,472

[45] Date of Patent: Nov. 17, 1992

[54] HYDROXY-FUNCTIONAL POLYETHERS AS THERMOPLASTIC BARRIER RESINS

[75] Inventors: Jerry E. White; James W. Ringer, both of Midland, Mich.

[73] Assignee: The Dow Chemical Company, Midland, Mich.

[21] Appl. No.: 467,070

[22] Filed: Jan. 18, 1990

[51] Int. Cl.⁵ ............................................. C08G 59/06
[52] U.S. Cl. ...................................... 528/97; 528/99; 528/104; 428/36.6; 428/413
[58] Field of Search ........................... 528/97, 99, 104

[56] References Cited

U.S. PATENT DOCUMENTS

| | | | |
|---|---|---|---|
| 2,602,075 | 6/1952 | Carpenter et al. | 528/104 |
| 3,305,528 | 2/1967 | Wynstra et al. | 260/47 |
| 3,308,204 | 3/1967 | Bugel | 260/837 |
| 3,336,257 | 8/1967 | Alvey | 528/104 |
| 3,364,178 | 1/1968 | Kreps et al. | 528/99 |
| 3,457,101 | 7/1969 | Hermitte et al. | 117/76 |
| 3,542,733 | 11/1970 | Nishimura et al. | 260/47 |
| 3,941,849 | 3/1976 | Herold | 260/607 A |
| 3,948,855 | 4/1976 | Perry | 260/47 |
| 3,979,211 | 9/1976 | Chaikin | 96/29 R |
| 4,048,141 | 9/1977 | Doorakian et al. | 260/47 |
| 4,132,706 | 1/1979 | Doorakian et al. | 528/89 |
| 4,152,156 | 5/1979 | Voisin et al. | 96/29 R |
| 4,171,420 | 10/1979 | Doorakian et al. | 528/89 |
| 4,267,301 | 5/1981 | Olsen et al. | 528/93 |
| 4,594,291 | 6/1986 | Bertram et al. | 428/414 |
| 4,657,954 | 4/1987 | Watanabe et al. | 528/104 |
| 4,722,981 | 2/1988 | Koenig et al. | 525/481 |
| 4,722,990 | 2/1988 | Koenig et al. | 528/95 |

FOREIGN PATENT DOCUMENTS 1296027 6/1985 Japan .

*Primary Examiner*—John C. Bleutge
*Assistant Examiner*—Frederick Krass

[57] ABSTRACT

Polyethers having improved barrier to oxygen are normally solid, thermoplastic polyethers having backbone repeating units of m-phenylene, p-phenylene, carbonyldiphenylene and/or sulfonyldiphenyl and pendent hydroxyl moieties. Such polyethers are prepared by reacting diglycidyl ethers of dihydric aromatic compounds such as the diglycidyl ether of bisphenol A with resorcinol.

11 Claims, No Drawings

HYDROXY-FUNCTIONAL POLYETHERS AS THERMOPLASTIC BARRIER RESINS

BACKGROUND OF THE INVENTION

This invention relates to thermoplastic polyethers having pendant hydroxyl moieties and to articles prepared from such polyethers.

Hydroxyphenoxyether polymers are known to be useful in the fabrication of articles exhibiting barrier properties. See, for example, Reinking et al, *J. Poly Sci.*, Vol. 7, pp. 2135-2144, pp. 2145-2152 and pp. 2153-2160 (1963) and *Encyclopedia of Polymer Science and Technology*, Vol. 10, pp. 111-122. Such polymers generally have only moderate oxygen barrier, i.e., they generally exhibit oxygen transmission rates of 2 to 75 cm$^3$-mil/100 in$^2$-atm-day.

In view of the limited barrier properties of the prior art polymers having pendant hydroxyl moieties and phenoxyether moieties, it would be highly desirable to provide a polymer having a genuinely high barrier (i.e., oxygen transmission rate less than 0.5 cm$^3$-mil/100 in$^2$-atm-day) to oxygen. Polymers that retain such high barrier in both dry and moist environments would be especially desirable.

SUMMARY OF THE INVENTION

The present invention is, in one aspect, a normally solid, thermoplastic polyether having repeating units represented by the formula:

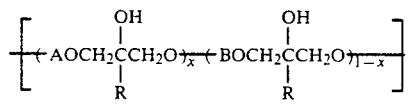

wherein each A is individually a divalent aromatic moiety selected from the group consisting of carbonyldiphenylene, m-phenylene, sulfonyldiphenylene, p-phenylene, and combinations thereof; each B is individually a divalent aromatic moiety or combinations thereof other than those listed for A, R is hydrogen or a monovalent hydrocarbon, and x is a number sufficient to reduce the oxygen permeability of the copolyether to a value which is measurably lower than that of a polyether consisting of repeating units represented by the formula:

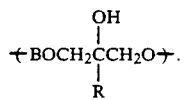

In the polyether, when A is carbonyldiphenylene, sulfonyldiphenylene or p-phenylene, x is no greater than 0.85. Surprisingly, the presence of the A-component into the polyether of this invention results in a polymer having thermoplastic character and increased barrier to oxygen in both dry and moist environments.

In another aspect, this invention is an article suitable for packaging oxygen-sensitive materials such as foodstuffs and medicines wherein the article is fabricated of the polyether. This article can be in the form of a molded container, an impermeable film or a coating or an interlayer of a laminate or a coextruded container.

In addition to their use as barrier containers and films, the polymers of this invention are also useful as molding, extrusion and casting resins.

DETAILED DESCRIPTION OF THE INVENTION

In preferred embodiments, the polyethers are copolyethers having repeating units represented by Formula I, each A is individually carbonyldiphenylene, sulfonyldiphenylene, p-phenylene or m-phenylene; each B is individually isopropylidene diphenylene, biphenylene, biphenylene oxide, methylenediphenylene, biphenylene sulfide, naphthylene, biphenylenecyanomethane, 3,3'-dialkyldiphenylene-isopropylidene, 3,3',4,4'-tetraalkyldiphenylene-isopropylidene, and the corresponding alkylsubstituted derivatives of the other named divalent aromatic moieties; and x is a number from about 0.1 to 0.75. R is hydrogen or a hydrocarbyl or substituted hydrocarbyl wherein hydrocarbyl is a monovalent hydrocarbon such as alkyl, cycloalkyl, aralkyl, or aryl and the substituent(s) is a monovalent moiety which is inert in the reactions used to prepare the copolyether. More preferably A is m-phenylene, B is isopropylidenediphenylene or biphenylene; R is hydrogen, methyl, ethyl or propyl; and x is about 0.1 to about 0.5. The copolyethers are most preferably those represented by the formula:

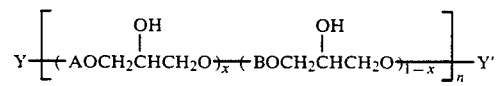

wherein A, B and x are as defined above, each Y and Y' is individually hydroxy or a monovalent organic terminating group, and n is a whole number from 10 to about 1000. Typically Y is hydroxy or glycidyl and Y' is hydroxyaryl.

The copolyethers are suitably prepared by contacting one or more of the diglycidyl ethers of a barrier dihydric phenol with one or more other dihydric phenols under conditions sufficient to cause the hydroxyl moieties to react with epoxy moieties to form a polymer backbone having ether linkages and pendant hydroxyl moieties. Conditions conventionally employed in the reaction of diglycidyl ethers with phenols to form ether linkages are suitably employed in preparing the resins of this invention. Examples of such suitable conditions are set forth in U.S. Pat. No. 4,647,648, which is hereby incorporated by reference in its entirety. Preferred conditions for preparing such resins are set forth in the following working examples.

The diglycidyl ethers of the barrier dihydric phenols are preferably the diglycidyl ethers of bisphenol ketone (sometimes called bisphenol K), bisphenol sulfone, resorcinol, hydroquinone and mixtures thereof. Of these preferred diglycidyl ethers, those of bisphenol ketone and resorcinol are more preferred, with the diglycidyl ether of resorcinol being most preferred.

Examples of the other dihydric phenols such as 4,4'-ispropylidene bisphenol (bisphenol A), 4,4'-dihydroxydiphenylethylmethane, 3,3'-dihydroxydiphenyldiethylmethane, 3,4'-dihydroxydiphenylmethylpropylmethane, bisphenol, 4,4'-dihydroxydiphenyloxide, 4,4'-dihydroxydiphenylcyanomethane, 4,4'-dihydroxybiphenyl, 4,4'-dihydroxybenzophenone, 4,4'-dihydroxydiphenyl sulfide, 4,4'-dihydroxydiphenyl sulfone, 2,6-dihydroxynaphthalene, 1,4'-dihydroxynaphthalene, catechol and other dihydric phenols listed in U.S. Pat. Nos. 3,395,118; 4,438,254 and 4,480,082 which are hereby incorporated by reference. Of these other dihydric phenols, bisphenol A, bisphenol and mixtures thereof are most preferred.

When resorcinol or hydroquinone is used as the barrier dihydric phenol, the copolyether can be suitably prepared by contacting the resorcinol or hydroquinone with one or more diglycidyl ethers of the other barrier dihydric phenols and/or diglycidyl ethers of the other dihydric phenols using the procedures and conditions of U.S. Pat. No. 4,647,648.

The barrier articles, e.g., containers, films and coatings, of this invention are fabricated from the copolyethers using conventional fabricating techniques for normally solid, thermoplastic polymers such as extrusion, compression molding, injection molding, blow molding and similar fabrication techniques commonly employed to produce such articles.

ILLUSTRATIVE EMBODIMENTS

The following examples are given to illustrate the invention and should not be interpreted as limiting it in any way. Unless stated otherwise, all parts and percentages are given by weight.

EXAMPLE 1

A. Preparation of the Copolyether

In a 100-mL flask, a mechanically stirred mixture of 8.218 g (36.0 mmol) of bisphenol A, 12.135 g (36.7 mmol) of the diglycidyl ether of bisphenol K and 17 mL of phenoxypropanol is heated under nitrogen to a temperature of 140° C. A 0.5-mL portion of ethyl-triphenyl-phosphonium acetate (70 percent in methanol) is added, and the temperature of the mixture immediately rises to about 175° C. To insure effective stirring of the increasingly viscous solution, an additional 8 mL of phenoxypropanol is added over a period of 35 minutes while the temperature of the solution is maintained at about 150° C. The solution is allowed to cool to 100° C. and is then diluted with 50 mL of dioxane. The resulting solution is poured slowly into a vigorously stirred blender containing 500 mL of a 1:1 mixture of methanol and water to precipitate fibrous solid. This solid is dissolved in dioxane, reprecipitated in a methanol/water mixture and dried in vacuo at 80° C. for 20 hours to yield 19.7 g (97 percent of theoretical yield) of a copolyether represented by the formula:

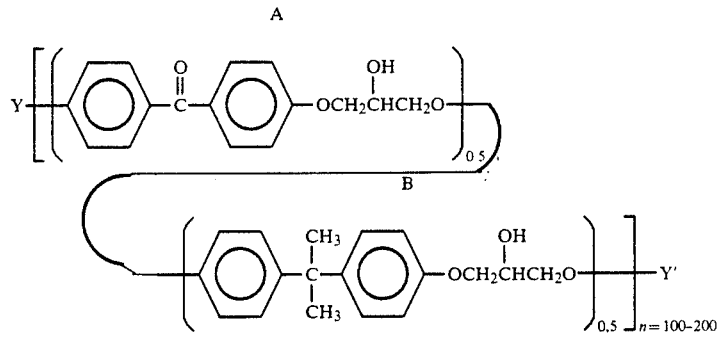

wherein Y and Y' are as previously defined.

B. Copolyether Testing

The copolyether is tested for intrinsic viscosity and Tg. Copolyether specimens (10 cm × 10 cm × 0.013 cm) for oxygen barrier evaluations are prepared by compression molding samples (3.5 g) of the polymer of Part B between Teflon sheets in a brass template at 200° C.–230° C. at 2000 psi (13.8 mPa) for 10–30 minutes, then at 200,000–400,000 psi (1380–2750 mPa) for 2–4 minutes and then cooled at 200,000–400,000 psi for 10 minutes. Oxygen transmission rates are then measured for the samples. The results of these tests are reported in Table I.

C. Additional Bisphenol K Copolyethers

For purposes of further exemplification, several additional 1:1 copolyethers of bisphenol K and other dihydric phenols listed in Table I are similarly prepared and tested, and the results of such tests are reported in Table I.

EXAMPLE 2

Following the procedure of Part A of Example 1 except that resorcinol is substituted for bisphenol K, several resorcinol copolyethers are prepared and then tested in accordance with Part B of Example 1. The results of these tests are also reported in Table I.

EXAMPLE 3

Following the procedure of Part A of Example 1 except that sulfonyl bisphenol is substituted for bisphenol K, several sulfonyl bisphenol copolyethers are prepared and then tested in accordance with Part B of Example 1. The results of these tests are also reported in Table I.

TABLE I

| Sample No. | Composition A | Composition B | A/B Ratio | η inh[1] (dL/g) | Tg[2] (°C.) | OTR[3],[4] 70–90% RH[5] |
|---|---|---|---|---|---|---|
| 1 | 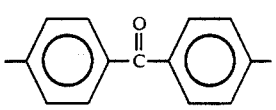 | 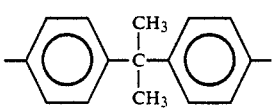 | 0.5:0.5 | 0.51 | 98 | 1.62 |

TABLE I-continued
| Sample No. | Composition A | B | A/B Ratio | η inh① (dL/g) | Tg② (°C.) | OTR③④ 70-90% RH⑤ |
|---|---|---|---|---|---|---|
| 2 |  1:1 | none | 1:0 | 0.54 | 91 | 0.37 |
| 3 | 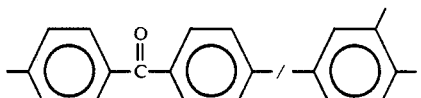 1:1 | none | 1:0 | 0.40 | 89 | 0.19 |
| 4 | 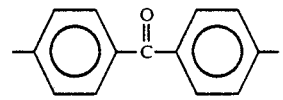 | 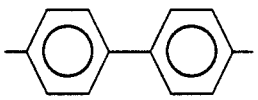 | 0.5:0.5 | 0.34 | 108 | ND |
| 5 | 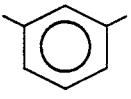 | 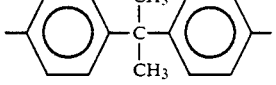 | 0.5:0.5 | 0.5 | 83 | 1.50 |
| 6 |  | 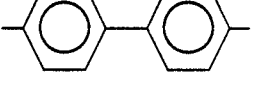 | 0.5:0.5 | 0.44 | 95 | 0.18 |
| 7 |  |  | 0.5:0.5 | 0.62 | 64 | 0.26 |
| 8 | 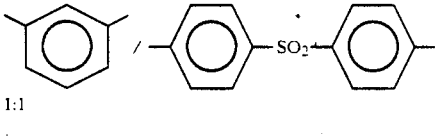 1:1 | none | 1:0 | 0.79 | 105 | 0.34 |
| 9 | 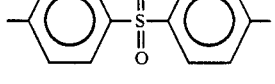 | 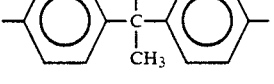 | 0.5:0.5 | 0.49 | 90 | 2.92 |
| 10 |  1:1 | None | 1:0 | 0.40 | 107 | 0.79 |
| 11 | 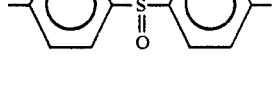 | 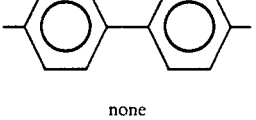 | 0.5:0.5 | 0.40 | 121 | 1.08 |
| 12 | 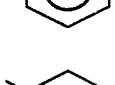 | none | 1:0 | 0.64 | 65 | 0.22 |
| 13 |  | 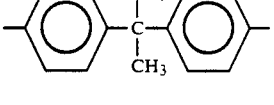 | 0.5:0.5 | 0.50 | 83 | 1.5 |

TABLE I-continued

| Sample No. | Composition A | Composition B | A/B Ratio | η inh① (dL/g) | Tg② (°C.) | OTR③④ 70-90% RH⑤ |
|---|---|---|---|---|---|---|
| 14 |  |  | 0.25: 0.75 | 0.67 | 89 | 3.8 |
| 15 |  | 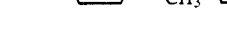 | 0.1:0.9 | 0.36 | 92 | 5.4 |
| C* | none |  | 0:1 | 0.44 | 102 | 9.0 |

① η inh - inherent viscosity in DMF at 0.5 g/dL and 25° C.
② Tg - glass transition temperature
③ ASTM Method D-3985 measured for compression molded films (23° C.-24° C.)
④ Oxygen transmission rate (OTR) measured in cc/mil/100 in2/atm/day
⑤ Relative humidity of the oxygen stream
*Not an example of the invention As evidenced by comparing the Oxygen Transmission Rates (OTR) for Sample Nos. 14-16 with the OTR for Sample No. C, the inclusion of rather small amounts of the monomer (A) produces a surprisingly large reduction in the oxygen permeability of the polyether.

What is claimed is:

1. A thermoplastic polyether having excellent barrier to oxygen and having repeating units represented by the formula:

$$\left[ (AOCH_2\underset{\underset{R}{|}}{\overset{\overset{OH}{|}}{C}}CH_2O)_{\overline{x}} (BOCH_2\underset{\underset{R}{|}}{\overset{\overset{OH}{|}}{C}}CH_2O)_{\overline{1-x}} \right]$$

wherein each A is carbonyldiphenylene; each B is individually a divalent aromatic moiety other than A; R is hydrogen or a monovalent hydrocarbon; and x is no greater than 0.85.

2. The polyether of claim 1 wherein each B is individually a divalent aromatic moiety selected from the group consisting of isopropylidene diphenylene, biphenylene, biphenylene oxide, methylenediphenylene, biphenylene sulfide, naphthylene, biphenylenecyanomethane, 3,3'-dialkyldiphenylene-isopropylidene, 3,3',4,4'-tetraalkyldiphenylene-isopropylidene, and alkyl-substituted derivatives of said aromatic moieties.

3. The polyether of claim 1 wherein x is a number about 0.1 to 0.75.

4. The polyether of claim 1 wherein each R is individually hydrogen, alkyl, cycloalkyl, aralkyl, or aryl.

5. The polyether of claim 2 wherein B is isopropylidene diphenylene.

6. The polyether of claim 5 wherein B is isopropylidene diphenylene; each R is individually hydrogen, methyl, ethyl or propyl; and x is a number from about 0.1 to about 0.5.

7. The polyether of claim 6 which is represented by the formula:

$$Y\left[ (AOCH_2\overset{\overset{OH}{|}}{C}HCH_2O)_{\overline{x}} (BOCH_2\overset{\overset{OH}{|}}{C}HCH_2O)_{\overline{1-x}} \right]_n Y'$$

wherein each Y and Y' is individually hydroxy or a monovalent organic terminating group, and n is a whole number from 10 to about 1000.

8. The polymer of claim 7 wherein A is carbonyldiphenylene, B is isopropylidenediphenylene, x is 0.5, and n is 200-400.

9. The polymer of claim 1 in the form of a barrier container.

10. The polymer of claim 2 in the form of a barrier film.

11. A thermoplastic polyether having excellent barrier to oxygen and having repeating units represented by the formula:

$$\left[ (AOCH_2\underset{\underset{R}{|}}{\overset{\overset{OH}{|}}{C}}CH_2O)_{\overline{x}} (BOCH_2\underset{\underset{R}{|}}{\overset{\overset{OH}{|}}{C}}CH_2O)_{\overline{1-x}} \right]$$

wherein each A is represented by the formula:

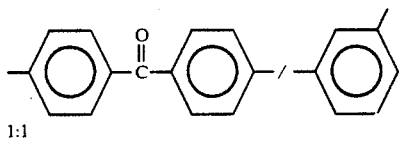

1:1 or

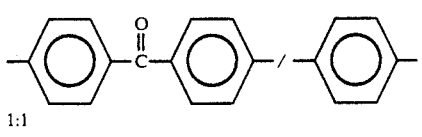

1:1 each B is individually a divalent aromatic moiety other than A; R is hydrogen or a monovalent hydrocarbon; and x is 1.

* * * * *